ABRASIVE ADJUSTMENT CONTROL FOR DOUBLE DISC GRINDER

Filed June 18, 1968 3 Sheets-Sheet 1

INVENTOR
ELMAN R. DUNN
BY
Mason, Porter, Diller & Brown
ATTORNEYS

11TR CONTACT STATUS

| CONTACT | STOP'D | START & RUN 4 SEC'S | | | | | | | |
|---|---|---|---|---|---|---|---|---|---|
| 11TR1 | 0 | X | X | X | X | X | X | X | 0 |
| 11TR2 | 0 | X | X | X | X | X | X | X | 0 |
| 11TR3 | 0 | X | 0 | X | 0 | X | 0 | X | 0 |
| 11TR4 | 0 | X | 0 | X | 0 | X | 0 | X | 0 |

INVENTOR
ELMAN R. DUNN
BY
Mason, Porter, Diller & Brown
ATTORNEYS

Feb. 9, 1971 E. R. DUNN 3,561,164

ABRASIVE ADJUSTMENT CONTROL FOR DOUBLE DISC GRINDER

Filed June 18, 1968

3 Sheets-Sheet 3

INVENTOR
ELMAN R. DUNN
BY
Mason, Porter, Diller & Brown
ATTORNEYS

United States Patent Office
3,561,164
Patented Feb. 9, 1971

3,561,164
ABRASIVE ADJUSTMENT CONTROL FOR DOUBLE DISC GRINDER

Elman R. Dunn, Roscoe, Ill., assignor to Litton Industries, Inc., Wayneboro, Pa., a corporation of Delaware
Continuation-in-part of application Ser. No. 529,804, Feb. 24, 1966. This application June 18, 1968, Ser. No. 741,150
Int. Cl. B24b 7/00, 49/00
U.S. Cl. 51—116 10 Claims

ABSTRACT OF THE DISCLOSURE

The apparatus of this disclosure relates to disc grinders for grinding thin workpieces which must be held within close limits. As ground workpieces emerge from the machine, they are measured by a post process gaging device. When a change in size of the workpiece indicates the need for adjustment of the discs, the gage may operate a signal or an automatic correcting device to make the necessary change. For the purpose of illustration, the correcting function is initiated by means of a push button. Successive operation of the push button in response to the signal from the post process gage advances one of the discs toward the other by a series of single increments. After a predetermined number of such increments, a counter transfers the subsequent signal or push button contact to effect the advance of the other disc. Thereafter, said other disc is advanced in response to the push button until it engages a sensing device. The sensing device then initiates operation of the feed mechanism to retract the disc which actuated the sensing device, a predetermined distance and advances the other disc by the same amount. This movement of the two discs restores them to the initial position relative to the guide members which direct the workpieces between the discs.

This application is a continuation-in-part of my copending commonly assigned application Ser. No. 529,804, filed Feb. 24, 1966 and now abandoned..

This invention relates to disc grinders of the double disc type wherein the discs have opposed faces between which elements to be ground are passed with the spacing of the faces determining the thickness of the workpiece being ground by the grinder, and there being fixedly positioned side guide members disposed in alignment with the discs for guiding the workpieces as they enter between the discs.

It will be apparent that when the discs are adjusted to compensate for wear, the faces thereof must be kept within certain limits with respect to the guide members. This presents no problem when the workpieces being ground are thick. However, when the workpieces are very thin, as in the case of piston rings which may have a thickness of $\frac{3}{32}$ inch, the space between the faces of the abrasives is very small. In the first place, the space between the abrasives does not permit the insertion of usual sensing devices. Secondly, the wear of the abrasives is not uniform with the result that one of the abrasives will wear quicker than the other. Accordingly, it is a problem maintaining the faces of the abrasives in alignment with the side guide members.

In view of the foregoing, it is the primary object of this invention to provide a system of adjusting the abrasives of a double disc grinder wherein the possibility of the guide members being engaged by an abrasive is restricted to a single one of the abrasives, and a single sensing device is positioned for engagement by one of the abrasives.

Another object of this invention is to provide an automatic control which, when actuated, as required to adjust the abrasives, will first effect the adjustment of one of the abrasives toward the other, and after a predetermined adjustment has occurred, will thereafter adjust the other of the abrasives toward the first mentioned abrasive and neither abrasive wears beyond the prescribed tolerance limit.

Another object of this invention is to provide in a double disc grinder a control mechanism responsive to a signal indicating that one of the abrasives is close to the tolerance limit, which will automatically retract the one abrasive a predetermined distance and advance the other abrasive a like distance so as to maintain the spacing between the faces of the abrasives with said abrasives spaced equally from the guide members.

In the preferred form of the invention, a relatively thin carbide sensing device is inserted between the abrasives and connected to a suitable signaling device. The sensing device is mounted on one end of a pivoted arm, the other end of which is arranged to move toward and from an air nozzle which, in turn, is connected through suitable control elements in a manner to actuate adjusting means for both abrasives to retract one and advance the other by the same amount whereby to restore them to a centered or aligned position with respect to the side guide members.

A change in size of the ground workpiece may be indicated by a post process visual gage in response to which the operator will initiate the correction function by means of a push button. In response to the first operation of the push button after the abrasives have been returned to their grind line positions, that is their positions centered relative to the guide members, the uncontrolled abrasive, that is the one that does not engage the sensing device, is advanced one increment. As the push button is sequentially operated, the uncontrolled abrasive will be further advanced a predetermined number of increments, after which a counter device will transfer the push button signal to the controlled abrasive and thereafter advancing of the abrasive will be restricted to the controlled abrasive.

The controlled abrasive advances until it engages the grind line sensing device at which time an automatic mechanism is actuated to retract the controlled abrasive a predetermined distance with the uncontrolled abrasive being advanced the same distance. The two abrasives are thus restored to their initial centered or grind line positions.

With the above and other objects in view that will hereinafter appear, the nature of the invention will be more clearly understood by reference to the following detailed description, the appended claims and the several views illustrated in the accompanying drawings.

Figures 1, 2, 3:
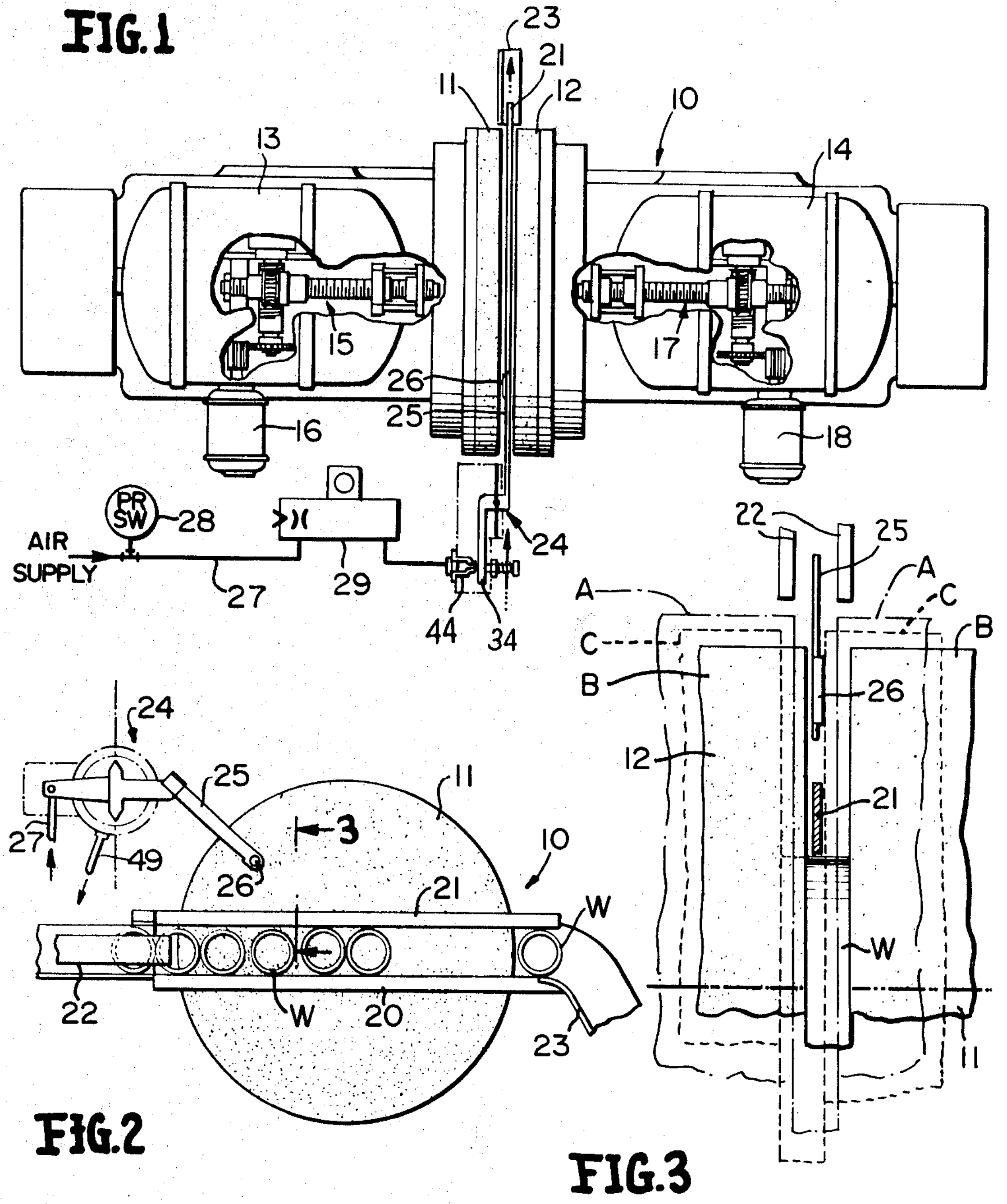
FIG. 1 is a plan view of a double disc grinder incorporating the controls of this invention.
FIG. 2 is a fragmentary vertical view through the machine between the two abrasives and shows the general position of the guide members and workpieces relative to the abrasive.
FIG. 3 is a schematic elevational view taken generally along the line 3—3 of FIG. 2 and shows the general manner in which the abrasives are adjusted.

Referring now to the drawings in detail, it will be seen that there is illustrated in FIG. 1 a double disc grinder formed in accordance with this invention and generally referred to by the numeral 10. The double disc grinder 10 includes a pair of abrasive discs 11 and 12. The disc 11 is driven by means of an electric motor 13 while an electric motor 14 rotates the disc 12. The discs 11 and 12 are adjustable towards and away from one another by means of suitable adjusting mechanisms which may be of any conventional type. The adjusting mechanism for the disc 11 is generally referred to by the numeral 15 and is driven by means of an electric motor 16 while the adjusting mechanism for the disc 12 is generally referred to by the numeral 17 and is driven by means of an electric motor 18.

The disc grinder 10 is of the type wherein workpieces W are directed by side guides 22 to move between the discs 11 and 12 and have the opposite faces thereof ground. In order to facilitate the guiding of the workpieces W between the discs 11 and 12, the grinder 10 includes a pair of vertically spaced guide members 20 and 21 usually referred to as guide bars. Other guide members known as side guides 22 are horizontally spaced and serve to direct workpieces between the discs. Similar side guides (not shown) receive the workpiece as it is discharged from the discs. Chute 23 receives the ground workpieces as they are discharged.

The illustrated workpieces are piston rings although the invention is not so limited. It is, however, to be understood that the workpieces are very thin and in the case of piston rings will have a thickness on the order of $\frac{5}{32}$ inch. Thus, it will be seen that the spacing between the faces of the abrasives 11 and 12 during the grinding operation will be on the order of $\frac{5}{32}$ inch.

When the abrasive discs 11 and 12 are initially adjusted, the guide members 20, 21 will be centered between the faces of these abrasives. However, since the wear of the abrasives is not equal, if the two abrasives were adjusted the same amount each time, the abrasive having the least wear on the face thereof would eventually come into contact with the guide members 20, 21. Both abrasives would also lose their alignment with the side guides 22. This is undesired and it is the prevention of this to which this invention relates.

For descriptive purposes, the abrasive 11 will be considered the controlled abrasive and the abrasive 12 will be considered the uncontrolled abrasive. In accordance with this invention, the movement of the controlled abrasive 11 toward a position where it approaches contact with the guide members 20, 21, is detected by a gage which is generally referred to by the numeral 24. The gage 24 is provided with a gage arm 25 which is very thin and which projects in between the abrasives 11, 12 within the plane of the guide members 20, 21. The gage arm 25 carries sensing device 26 which opposes the face of the abrasive 11 and which projects toward the abrasive 11 beyond the guide members 20, 21. The sensing device 26 is preferably formed of a carbide or other wear resisting material so as to resist abrasion when contacted by the abrasive 11.

In FIG. 1 there is schematically illustrated the general details of the gage 24, which gage is of the pneumatic type and is connected by means of an air line 27 to a source of air under pressure. The pressure of air supplied to the gage 24 through the line 27 is controlled by a pressure regulator switch 28. There is also incorporated in the air line 27 a gage 29 which detects variation in the pressure of air flowing through the air line 27 and which is constructed to complete an electrical circuit. The gage 24 may be considered a grind line gage. The further details of construction and operation of the gage will be apparent by reference to FIGS. 6 through 9.

The term grind line generally relates to the location of the operative face of an abrasive disc when it is in grinding contact with the workpiece, particularly when said workpiece has been ground to the desired size.

The gage 24 includes a sealed housing 30 having a portion thereof closed by means of a resilient diaphragm 31. The diaphragm 31 is secured to the housing 30 by means of a ring 32 and fasteners 33. There is clamped to the opposite sides of the diaphragm 31 generally L-shaped arm elements 34 and 35 which have their opposed ends secured to pivot elements 36 and 37. As is clearly shown in FIG. 8, the pivot elements 36 and 37 are connected together by means of a fastener 38 which is threaded into the arm element 34. The arm element 35 is secured to its respective pivot element 37 by means of fasteners 40 which pass through the pivot element 37, the diaphragm 31 and the pivot element 36, and are threaded into the arm element 34. The end of the arm element 35 remote from the pivot element 37 is provided with a clamp structure 41 in which the gage arm 25 is replaceably mounted. It is to be noted that the specific mounting of the gage arm 25 permits the gage arm to be interchangeable with a minimum of effort and at the same time allows the gage arm 25 to be relatively short so that it may be of a thin construction.

It is to be noted that the pivot elements 36 and 37 are elongated and are provided at the opposite ends thereof with pointed portions 42 which terminate immediately adjacent the ring 32 and the remainder of the housing 30 while being entirely supported by the diaphragm 31. The specific shape of the pivot elements 36, 37 and the mounting thereof on the diaphragm 31 controls the pivoting of the arm elements 34 and 35 to a predetermined axis. This axis is a vertical axis lying in the plane of the diaphragm 31 and in alignment with the points 42 of the pivot elements 36 and 37.

The wall of the housing 30 opposing the diaphragm 31 has a plate 43 mounted thereon, which plate supports a nozzle or orifice device 44. The air line 27 is connected thereto. The arm element 34 extends through the housing 30 to a position facing the orifice 44 and spaced therefrom a predetermined amount determined by means of an adjusting screw 45 which is threadedly engaged into the housing 30 and a threaded element 46 carried thereby. A spring 47 carried by the adjusting screw 45 retains the adjusting screw in an adjusted position.

It will be readily apparent that the back pressure at the nozzle 44 will depend upon the closeness of the arm element 34 to the nozzle 44. Therefore, when the sensing device 26 is engaged by the abrasive 11 and the gage arm 25 is pivoted in a clockwise direction, as viewed in FIG. 8, the arm element 34 will move toward the nozzle 44 and restrict the flow of air therefrom. This will result in a build up in pressure within the air line 27, which pressure build up, although minute, will immediately be sensed by the gage 29.

It is to be noted that the housing 30 has a discharge fitting 48 to which there is connected an exhaust line 49. It is also to be noted that the housing 30 will be mounted in a fixed position with respect to the abrasive 11 in a desired manner including that illustrated in the drawing, but not specifically described.

OPERATION

Referring now to FIG. 3 in particular, it will be seen that there is schematically illustrated the general operation of the adjusting of the abrasive 11 and 12 to compensate for the wearing away of the faces thereof during grinding operations.

The faces of the abrasives 11, 12 are spaced apart a distance equal to the desired thickness of the workpiece W. In addition, the faces of the abrasives are initially centered with respect to the guide members 20, 21 and aligned with the side guides 22. This initial starting position of the abrasive is identified in FIG. 3 by the letter A.

After the workpeces W pass between the abrasives 11, 12, the thickness thereof is measured in a conventional manner and as the thickness approaches the limit of the oversize tolerance, this is detected and the adjustment of the spacing between the abrasive is either automatically or manually initiated.

In accordance with this invention, initially the abrasive 11 is not adjusted and as the face thereof wears away, the face moves to the right away from the sensing device 26 and the guide members 20, 21. The face of the abrasive 12 also wears away, but the abrasive 12 is adjusted to the right so as to maintain the proper spacing between the faces of the abrasives 11, 12. Thus, the face of the abrasive 12 moves toward the guide members 20, 21. This adjusting of the spacing between the abrasives occurs a predetermined number of times until the abrasives reach the position generally identified by the letter B in FIG. 3. It is to be understood that in view of the relative positions of the sensing device 26 and the guide members 20, 21, the adjustment of the abrasive 12 will always be stopped before said abrasive engages the guide members 20, 21.

After the abrasives 11, 12 reach position B, further adjustment of the abrasives due to wear is limited to the abrasive 11. Thus, as the abrasives wear further, the face of the abrasive 12 will wear away from the adjacent side guides 22 as well as from the guide members 20, 21, and the face of the abrasive 11 will be adjusted toward the adjacent side guides 22 and the guide members 20, 21. This wearing away and adjustment will continue until the face of the abrasive 11, which is the controlled abrasive, engages the sensing device 26 so as to actuate the gage 24. At this time, the abrasives 11, 12 are off center to the left, as viewed in FIG. 3, and are in positions identified by the letter C.

The gage 24, through the operation of the pressure sensitve switch 29, will effect the automatic movement of the abrasives 11, 12 a like distance to the right, which position will be substantially the original position A. Thereafter, the adjusting sequence will be repeated.

INCREMENT ADJUSTING SYSTEM

Figures 4, 5:
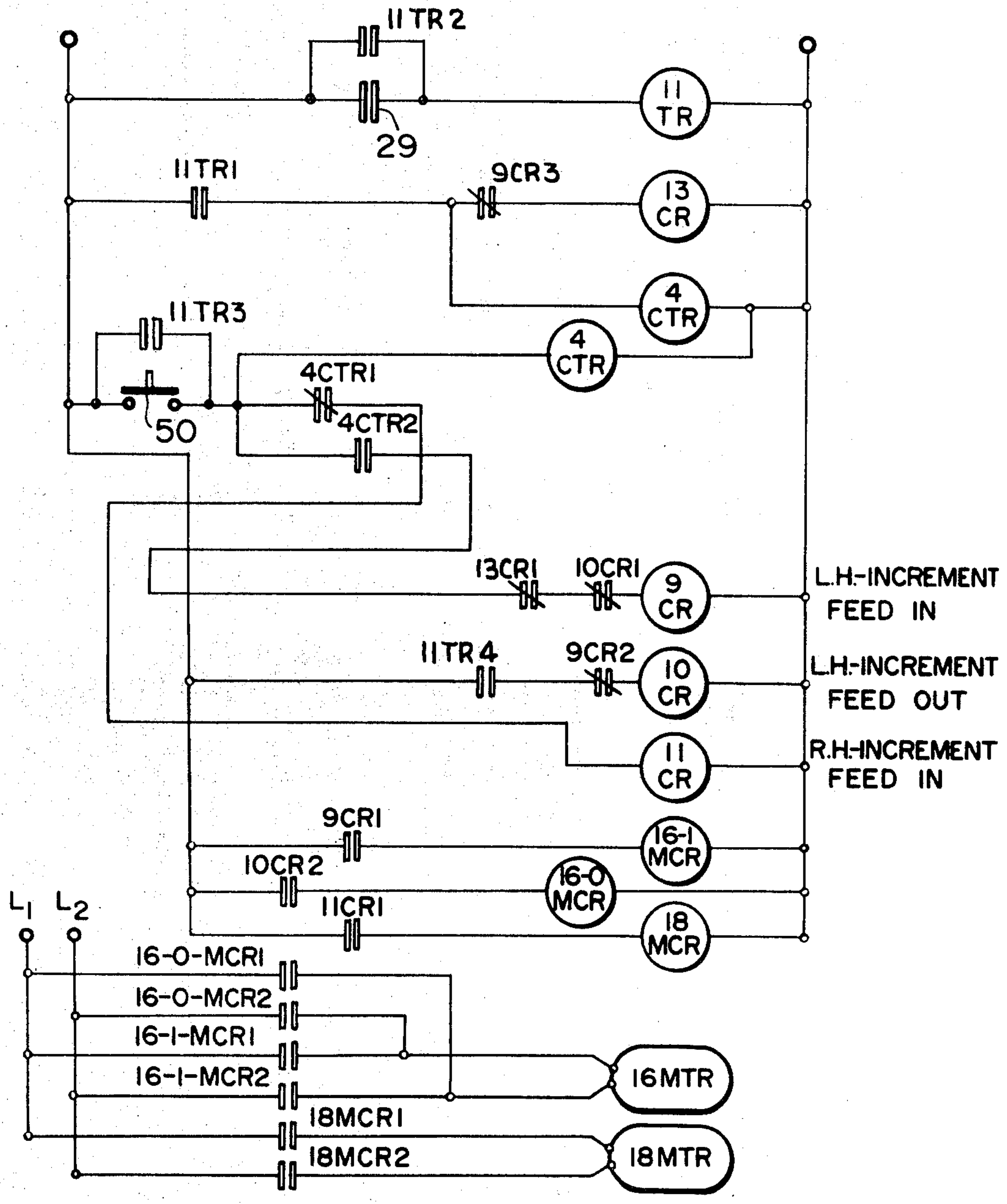
FIG. 4 is a wiring diagram of the automatic controls for the grinder.
FIG. 5 is a diagrammatic schedule of the contact status of the control device 11TR of FIG. 4.
Figures 6, 7, 8, 9:
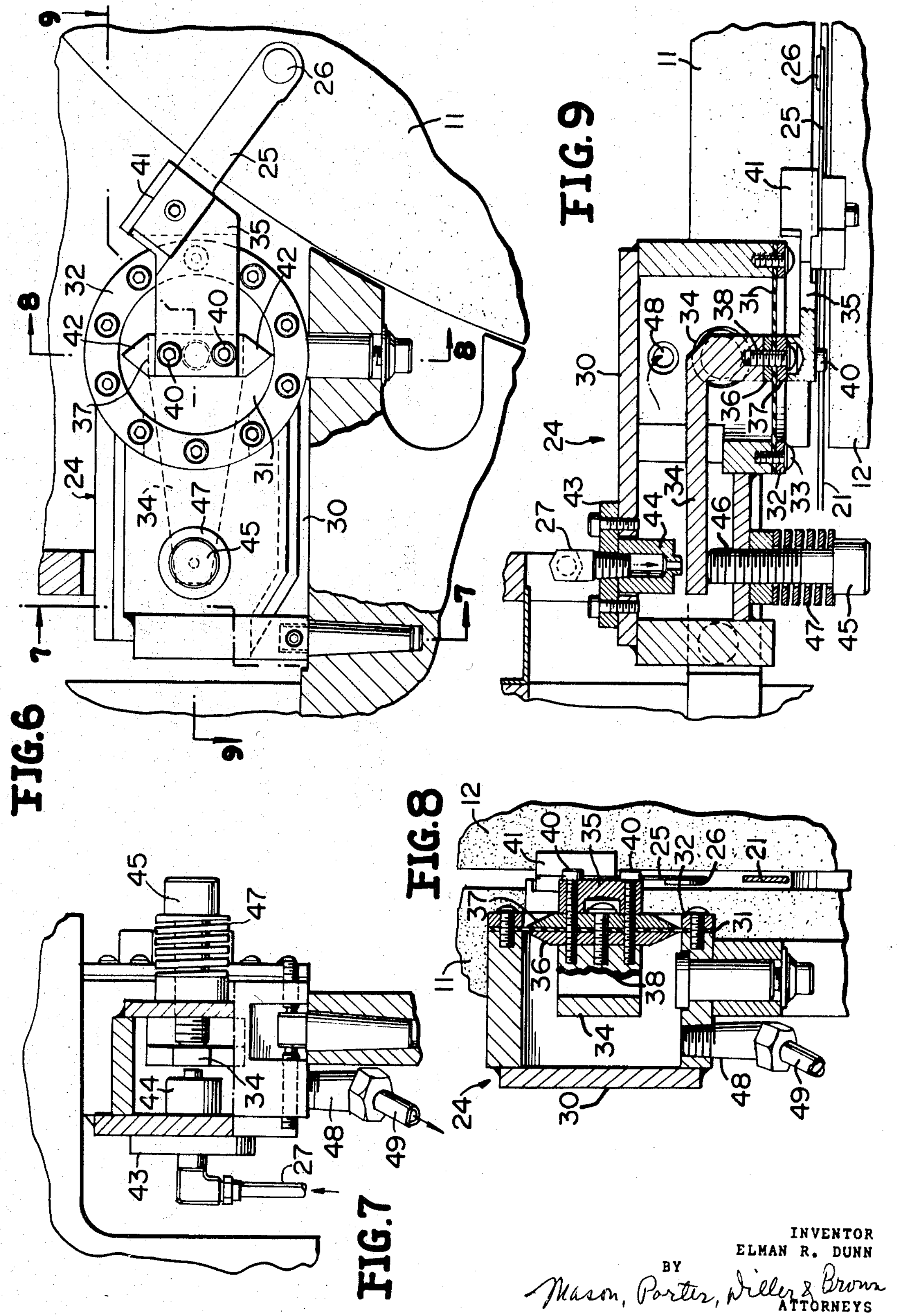
FIG. 6 is an enlarged fragmentary elevational view showing more specifically the details of the gage and its relationship to one of the abrasives.
FIG. 7 is a fragmentary vertical sectional view taken along the line 7—7 of FIG. 6 and shows further the details of the gage.
FIG. 8 is a fragmentary vertical sectional view taken along the line 8—8 of FIG. 6 and shows further the details of the gage.
FIG. 9 is a fragmentary horizontal sectional view taken along the line 9—9 of FIG. 6 and still further shows the details of the gage.

Referring now to FIG. 4, it will be seen that there is illustrated the wiring diagram of the electrical system for selectively energizing the electric stepping motors 16 and 18 (referred to in FIG. 4 as 16MTR and 18MTR, respectively) to effect the increment adjustment of the abrasives 11 and 12. The setting of the circuit is in accordance with that which exists after the abrasives 11 and 12 have been centered relative to the guide members and the system is ready to effect an initial adjustment of the abrasives to compensate for the wear thereof. When it is detected that the workpieces are approaching an oversized condition, a switch 50, which may be a push button switch or a gage-operated switch is actuated, thereby completing a circuit through the normally closed contact 4CTR1 to energize the circuit relay 11CR. This results in the closing of the contact 11CR1 which completes the circuit to the motor relay 18MCR. The closing of the motor circuit relay 18MCR results in the closing of the contacts 18MCR1 and 18MCR2 to energize the motor 18 whereby the abrasive 12 is advanced one increment.

The closing of the switch 50 also momentarily energizes the conventional counting relay 4CTR and advances the same one step.

When an oversize condition of the workpieces is detected, the switch 50 is closed. Each time the switch 50 is closed, the counting relay 4CTR is energized and after it counts a predetermined number of times, it operates to automatically open the contact 4CTR1 and close the contact 4CTR2. Thereafter, each closing of the switch 50 will complete the circuit through the contact 4CTR2 to energize the circuit relay 9CR. At this time the abrasives 11, 12 are in the position B of FIG 3.

Each time the switch 50 is closed to energize the circuit relay 9CR, the contact 9CR1 is closed, thereby energizing the motor circuit relay 16–I–MCR. This, in turn, results in the closing of the contacts 16–I–MCR1 and 16–I–MCR2 to temporarily energize the motor 16 to feed in the abrasive 11 one increment.

The abrasive 11 is increment fed in, in response to each closing of the switch 50 until it contacts the sensing device 26 at which time the gage 24 is actuated and the pressure sensitive switch 29 is closed. This results in the energization of a conventional programming timer 11TR which, within itself, closes contacts 11TR1 and 11TR2. The programming timer 11TR is a motor driven device which contains a series of cam actuated limit switches which perform the automatic switching functions in accordance with the schedule of contact status of timer 11TR shown in FIG. 5 wherefrom it is evident that the contacts 1 and 2 are actuated by a single lobed cam and the contacts 3 and 4 by a four lobed cam. The closing of the contact 11TR1 results in the energization of the cricuit relay 13CR. When the circuit relay 13CR is energized, the contact 13CR1 is opened to prevent energization of 9CR during the period of restoring the abrasives to their initial grind line positions. At the same time, through contact 11TR1, a circuit through the counting relay 4CTR is completed and the counter is reset to its initial condition with the contact 4CTR1 being closed and the contact 4CTR2 being opened. The closing of 11TR2 provides a holding circuit around gage switch 29 to assure continuing energization of 11TR, inasmuch as gage switch 29 contacts open during the programmed leftward movement of the abrasive discs 11 and 12.

During the self-timed period of energization of 11TR, contacts 11TR3 and 11TR4 are closed and re-opened four times. This intermittent closing and opening of 11TR3 and 11TR4 produces intermittent energization and de-energization of the circuit relays 11CR and 10CR, respectively.

Each energization of the circuit relay 10CR results in the opening of the normally closed contact 10CR1 to make certain that the circuit relay 9CR is not energized. At the same time, the contact 10CR2 is closed to energize the motor circuit relay 16–O–MCR. Each energization of the circuit relay 11CR results in the closing of the normally opened contact 11CR1 to energize the motor circuit relay 18MCR.

The motor circuit relay 16–O–MCR intermittently closes and opens contacts 16–O–MCR1 and 16–O–MCR2 to energize the motor 16 intermittently to feed the abrasive 11 outwardly toward alignment with the adjacent side guides 22 and away from the sensing device 26 a predetermined number of four increments. At the same time, the motor circuit relay 18MCR serves to intermittently close and open the contacts 18MCR1 and 18MCR2 to energize the motor 18 intermittently and to feed-in the abrasive 12 the same number of increments as the abrasive 11 is fed outward so that the spacing between the abrasives 11 and 12 remains the desired spacing for the particular workpiece. In this manner the abrasives 11 and 12 are returned to their starting positions A of FIG. 3 in alignment with side guides 22 and the further increment infeeding of the abrasives for purposes of workpiece size control may be repeated.

Simultaneously with the fourth intermittent opening of contacts 11TR3 and 11TR4, contacts 11TR1 and 11TR2 also are opened. The opening of contact 11TR2 de-energizes 11TR, at which time the abrasive 11 has been moved out of engagement with the sensing device 26 and the pressure sensitive switch is opened. The opening of contact 11TR1 de-energizes relay 13CR and counting relay 4CTR simultaneously. The system is thus returned to its normal condition.

Although only a preferred embodiment of the invention has been specifically illustrated and described herein, it is to be understood that minor variations may be made both in the sensing device, the electrical system and the method of increment feeding the abrasives without departing from the spirit and scope of the invention as defined in the appended claims.

I claim:

1. In a double disc grinder for grinding relatively thin workpieces,
(a) oppositely disposed abrasive discs movable axially toward and from one another,
(b) guide members for guiding workpieces between said discs,
(c) incremental means for positioning each disc,
(d) a single sensing means adapted to be actuated by one of said abrasive discs after a predetermined movement of said one abrasive disc toward the other for simultaneously retracting one of said abrasive discs a predetermined amount and advancing the other abrasive disc by the same amount to restore said abrasive discs to alignment with said guide members.

2. The double disc grinder of claim 1 wherein:
(a) said sensing means includes a gage arm having a contact surface extending between said discs and adapted to be engaged by one of said discs.

3. The double disc grinder of claim 1 wherein:
(a) said sensing means includes a gage arm having a contact surface opposing said one disc,
(b) signal generating means operably coupled to said gage arm,
(c) said signal generating means including a housing sealed by a resilient diaphragm,
(d) said diaphragm supporting said gage arm at an intermediate point.

4. The double disc grinder of claim 1 wherein:
(a) said sensing means includes a gage arm having a contact surface opposing said one disc,
(b) signal generating means operably coupled to said gage arm,
(c) said signal generating means including a housing sealed by a resilient diaphragm,
(d) said diaphragm supporting said gage arm at an intermediate point,
(e) and means limiting the deflection of said diaphragm to a fixed axis.

5. The double disc grinder of claim 1 wherein:
(a) said sensing means includes a gage arm having a contact surface opposing said one disc,
(b) signal generating means of the pneumatic type operably coupled to said gage arm,
(c) said signal generating means including a housing sealed by a resilient diaphragm,
(d) said diaphragm supporting said gage arm at an intermediate point,
(e) said signal generating means including a fluid line having a terminal orifice within said housing,
(f) said gage arm having a portion closely opposing said terminal orifice and varying the flow of fluid therethrough,
(g) and means for detecting variations in pressures in said fluid line.

6. In a double disc grinder for grinding relatively thin workpieces,
(a) oppositely disposed abrasive discs movable axially toward and from one another,
(b) guide members for guiding workpieces between said discs, (c) incremental means for advancing each disc,
(d) a single control means for actuating said incremental means,
(e) and automatic means for transferring said single control means from one incremental means to the other incremental means.

7. The double disc grinder of claim 6 wherein:
(a) said automatic means includes a counter whereby said one incremental means will automatically be actuated a predetermined number of times before said single control means actuates said other incremental means.

8. The double disc grinder of claim 1 together with:
(a) a single control means for actuating said incremental means for selectively advancing said discs as said discs wear,
(b) and automatic means for first actuating the incremental means for the other of said discs through said single control means and then transferring said single control means to actuate the incremental means for said one disc.

9. The double disc grinder of claim 1 together with:
(a) a single control means for actuating said incremental means for selectively advancing said discs as said discs wear,
(b) automatic means for first actuating the incremental means for the other of said discs through said single control means and then transferring said single control means to actuate the incremental means for said one disc,
(c) and said automatic means includes a counter whereby said other disc incremental means will automatically be actuated a predetermined number of times before said single control means actuates said one incremental means.

10. In a double disc grinder for grinding relatively thin workpieces,
(a) oppositely disposed abrasive discs movable axially toward and from one another,
(b) guide members for guiding workpieces between said discs,
(c) incremental means for advancing and retracting each disc,
(d) a single control means for actuating said incremental means,
(e) automatic means for transferring said single control means from one incremental means to the other incremental means,
(f) and a single sensing means adapted to be actuated by the abrasive disc advanced and retracted by said other incremental means after a predetermined advance movement of said other abrasive disc for simultaneously advancing said one abrasive disc a predetermined amount and retracting the other abrasive disc by the same amount to restore said abrasive discs to alignment with said guide members.

References Cited

UNITED STATES PATENTS

| | | | |
|---|---|---|---|
| 1,416,952 | 5/1922 | Gardner | 51—116X |
| 2,209,711 | 7/1940 | Young | 51—116X |
| 2,656,653 | 10/1953 | Gardner | 51—165X |

HAROLD D. WHITEHEAD, Primary Examiner

U.S. Cl. X.R.

51—165